Nov. 22, 1955 A. P. DINSMORE 2,724,445
SPEED CONTROLLER FOR A PRIME MOVER DRIVEN PROPELLER
Filed Nov. 30, 1951 2 Sheets-Sheet 1

INVENTOR.
ALBERT P. DINSMORE
BY Willits, Hardman and Fehr
HIS ATTORNEYS

Nov. 22, 1955   A. P. DINSMORE   2,724,445
SPEED CONTROLLER FOR A PRIME MOVER DRIVEN PROPELLER
Filed Nov. 30, 1951
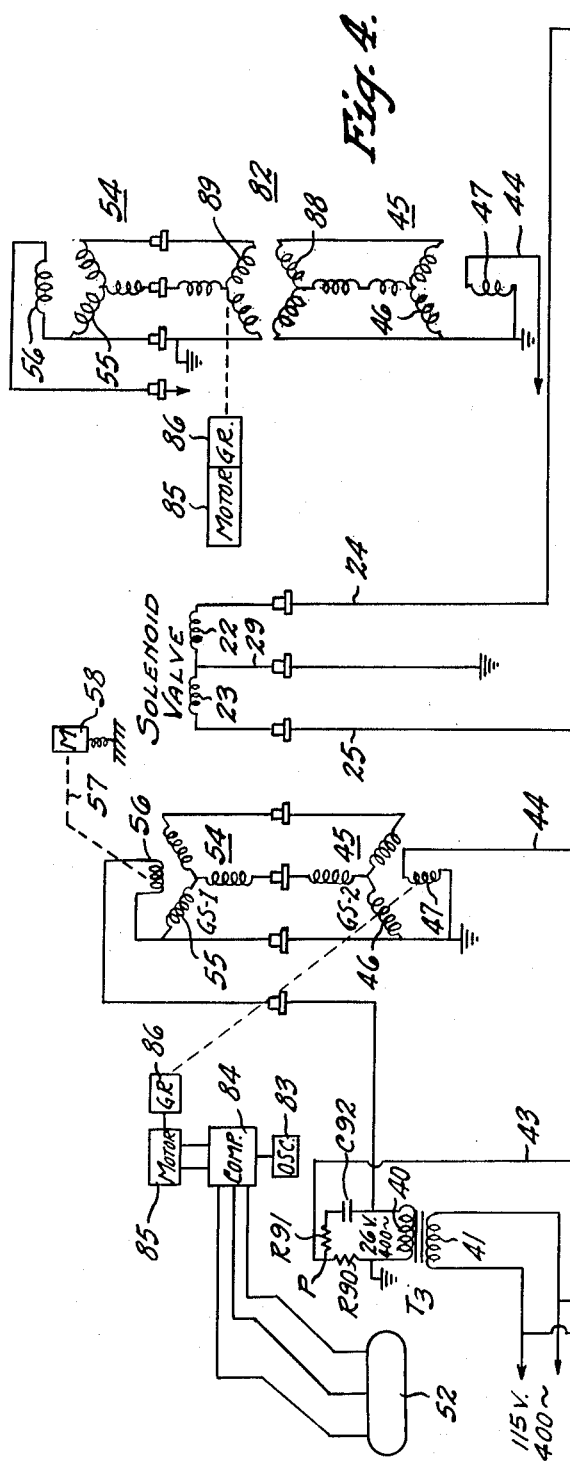
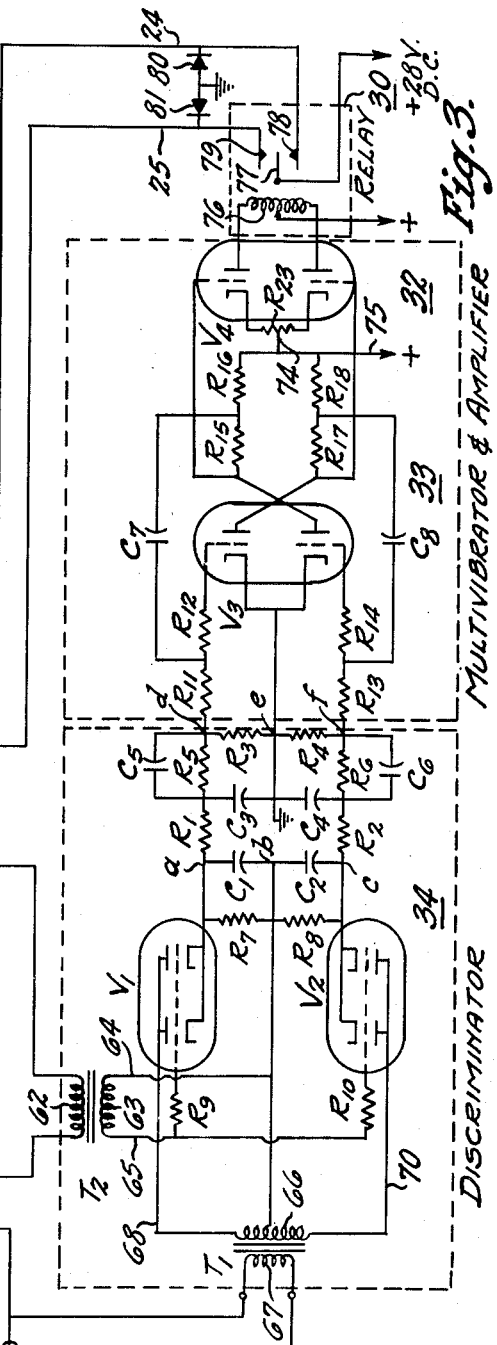
INVENTOR.
ALBERT P. DINSMORE
BY Willits, Hardman and Fehr
HIS ATTORNEYS

United States Patent Office 2,724,445
Patented Nov. 22, 1955

2,724,445

SPEED CONTROLLER FOR A PRIME MOVER DRIVEN PROPELLER

Albert P. Dinsmore, Dayton, Ohio, assignor to General Motors Corporation, Detroit, Mich., a corporation of Delaware Application November 30, 1951, Serial No. 259,239

16 Claims. (Cl. 170—160.17)

The present invention relates to speed control of a variable load device, and more particularly to a governor for use with propellers driven by aircraft prime movers.

One of my objects is to provide control means for adjusting the load to accomplish a selected fixed speed setting of a prime mover driving the load. I accomplish this object by providing a control system for governing the speed of a prime mover at a selected speed setting. Specifically, the control system has associated therewith a selsyn system having one stator-rotor combination mounted on the propeller, and a second stator-rotor combination mounted in the aircraft cockpit. The rotor of the stator-rotor combination mounted on the propeller is energized with alternating current, and is adapted to be rotated on its axis by speed responsive means within the propeller. The rotor of the second stator-rotor combination is the speed selector, and is set to a position which produces a signal null across its terminals when the rotor of the propeller selsyn system is in a position representing equilibrium at the selected speed setting. Deviation from this selected speed setting causes the speed responsive means to rotate the rotor of the stator-rotor combination mounted on the propeller to produce speed error signals across the output terminals of the rotor of the second stator-rotor combination. These A. C. signals are proportional in amplitude to the amount of speed error from the selected speed setting, and change phase with the character of the speed error.

These A. C. signals are supplied to a discriminator circuit, and specifically to the grids of triode rectifiers, the plates of which are connected to an A. C. current source of the same frequency as that used for energizing the propeller selsyn system. As the selsyn system is adapted to govern the speed of the prime mover at the signal null, the grids of the triode rectifiers are provided with a small signal 90 electrical degrees from each of the plate signals of sufficient magnitude to place the triodes in condition for conduction whenever a speed information signal is applied to the grids from the selsyn system. Thus, the dead band range associated with the null of a selsyn signal is overcome.

The discriminator circuit forms a part of the control organization which includes a multivibrator, an amplifier and a relay energized by the amplifier output. The discriminator controls the bias applied to the grids of the multivibrator to produce alternate electrical impulses of varying time duration, as controlled by the speed information supplied to the discriminator. The alternate electrical impulses are amplified and utilized to energize a relay for periods of time corresponding with the length of the pulses. The relay, upon actuation, energizes an electric valve that controls a fluid organization which adjusts the propeller blades.

When the prime mover is operating at the selected speed setting, the time durations of the electrical pulses applied to the opposite solenoids of the electric valve are of equal length. However, when the prime mover is operating at a speed other than the selected speed setting, the speed information supplied by the selsyn system to the discriminator alters the time duration of the oppositely acting pulses applied to the opposite solenoids of the electric valve. The electric valve will then supply more fluid to one side of the blade actuating motor than to the other, and the pitch of the blades will be adjusted thereby adjusting the load on the prime mover until the prime mover speed is again at the selected speed setting.

Further objects and advantages of the present invention will be apparent from the following description, reference being had to the accompanying drawings in which similar reference characters denote similar elements in the several views.

In the drawings:

Fig. 3 is a detailed circuit diagram of the principal elements of the control organization.

Fig. 4 is a modification of the selsyn system disclosed in Fig. 3.

Figure 1:
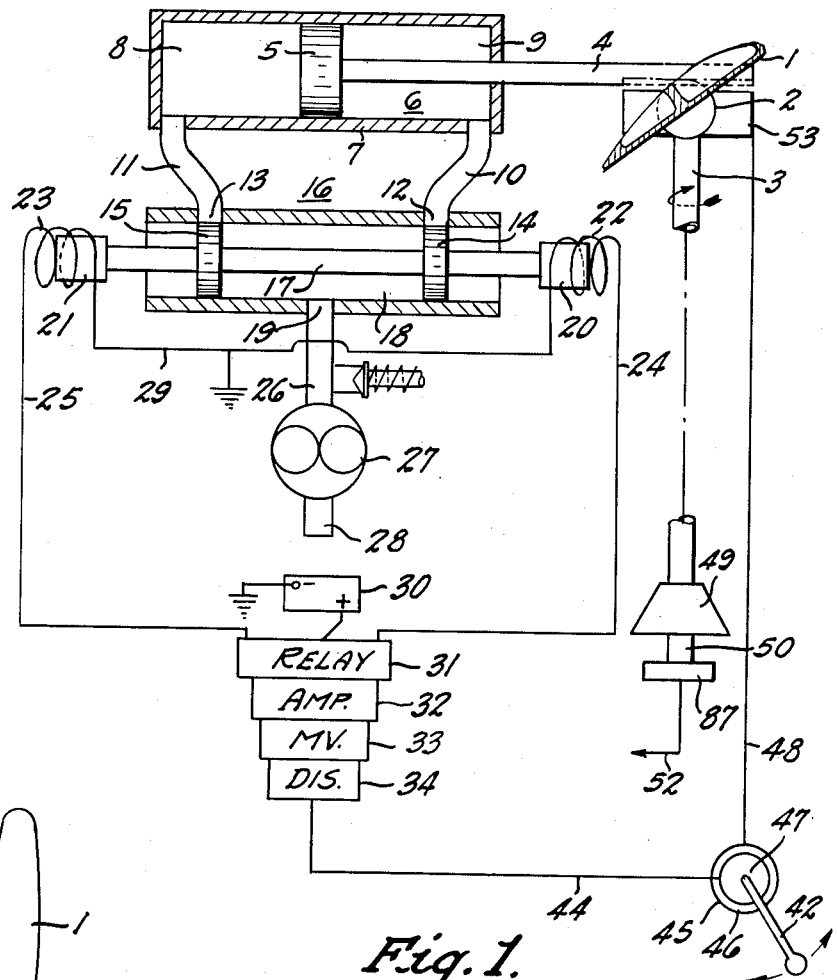
Fig. 1 is a combined schematic and block diagram illustrating a fluid organization for adjusting the load and an electrical control organization controlling the fluid organization.

Referring more particularly to Fig. 1 of the drawings, the reference character 1 indicates a blade of a variable pitch propeller adjustable in a blade socket 2 attached to a hub 53 which is driven by a prime mover 49, such as a turbine, through shaft 3. The prime mover 49 also drives a three-phase alternator 87 by means of shaft 50. A fluid motor designated generally by 6, having a double-acting piston 5 and a piston rod 4, is used to vary the pitch setting of the blade 1. The fluid motor 6 is housed in a casing 7 provided with a decrease pitch chamber 8 and an increase pitch chamber 9. Chamber 8 is connected by passage 11 to port 13 of an electrically operated valve 16 which also has a port 12 connected by passage 10 with chamber 9 of the fluid motor. The electrically operated valve 16 movably supports a spool valve 17 provided with spaced lands 14 and 15 that normally and in the rest position completely stop fluid flow through ports 12 and 13. Fluid under pressure is provided by a pump 27 from an inlet pipe 28 through a delivery passage 26 to a port 19 connected with chamber 18 of the electrically operated valve 16. Extending on opposite sides of the spool valve 17 there are provided armatures 20 and 21 disposed within solenoid coils 22 and 23, connected by a common lead 29 to ground and by leads 24 and 25 to a relay 31. Relay 31 is connected to a D. C. current source 30 and controls the movements of the electric valve 16 in accordance with signal pulses received from an amplifier 32, produced by a multivibrator 33 under the control of a discriminator 34. Depending on the signal received from the relay 31, one and then the other of the solenoids 22 and 23 will be energized by alternate electrical impulses causing movement of the spool valve 17 in one direction and then the other to connect the ports 12 and then 13 with the pressure supply port 19. Henceforth, by alternate electrical pulses to the electric valve 16, I mean oppositely acting pulses which are supplied alternately, and in succession to the opposite solenoids 22 and 23 of the electric valve.

Figure 2:
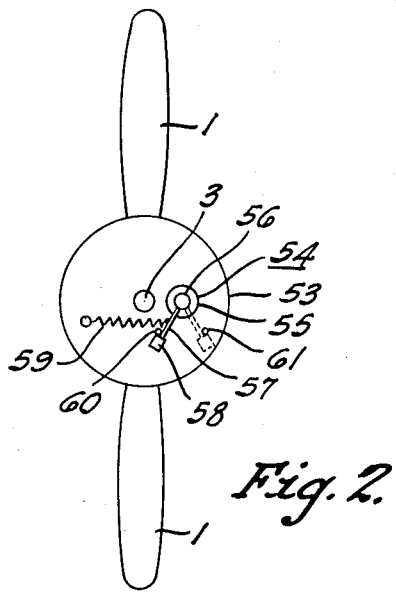
Fig. 2 is a front view of the propeller and its associated mechanism.

Referring particularly to Figs. 1 and 2, propeller blades 1 are mounted in a propeller hub 53 which rotates with the shaft 3. A stator-rotor combination 54, or rotary transformer which may take the form of a selsyn, is mounted in the hub 53 and includes a stator 55 and a rotor 56. The rotor 56 is adapted for angular movement with respect to the stator 55 by speed sensitive means including an arm 57 having attached thereto a centrifugal mass 58. A spring 59 attached at one end to the propeller hub 53 and at the other end to the arm 57 retains the arm against a stop 60 until the centrifugal force acting on mass 58 due to rotation of the propeller hub 53 is sufficient to overcome the restraining force of spring 59. A second stop 61 limits the maximum outward movement of the arm and mass under the influence of centrifugal force. The stator 55 is electrically connected by 48 to a stator 46 of a second stator-rotor combination or output selsyn 45. The rotor 47 of stator-rotor combination 45 is electrically connected by means 44 to a discriminator 34.

Fig. 3 shows a schematic representation of the control organization. A transformer T1 has a primary winding 67 energized by a 400-cycle source of alternating current. The plates of the discriminator tubes V1 and V2, considered for the moment as simple rectifiers, are connected by means of 68 and 70 to the ends of split secondary winding 66 of the transformer T1. If current flows in the two halves of the secondary winding and the circuit is balanced, then equal charges will appear on condensers C1 and C2. These charges will be positive at points $a$ and $c$ with respect to point $b$, and likewise, equal potentials will appear at points $d$ and $f$, since the resistance networks from points $a$ to $d$ and $c$ to $f$ are identical.

The grids of tubes V1 and V2 are connected by means of grid resistors R9 and R10 to one end of secondary 63 of transformer T2 by means of 65. The other end of the secondary winding 63 of transformer T2 is connected to the center tap of T1.

Speed information is supplied to secondary winding 63 of transformer T2 by means of primary winding 62. Primary 62 is connected to ground by means of line 43 and resistor R90. Primary 62 is also connected to the winding of rotor 47 of the output selsyn 45 by means of 44. The rotor 47 of output selsyn 45 is adapted to be positioned by control lever 42 to select a speed setting. Propeller rotation at the selected speed will cause arm 57 to rotate rotor 56 of the input selsyn 54 to an equilibrium position under the urge of centrifugal force acting on mass 58 as opposed by spring 59. While rotor 56 is maintained in this equilibrium position, a signal null will appear across the winding of rotor 47. Speed error signals are induced in the winding of rotor 47 from stator 46 by transformer action whenever rotor 56 of input selsyn 54 is displaced from this equilibrium position by the centrifugal mass 58 and its associated arm 57 due to a discrepancy between the speed of propeller rotation and the selected speed setting. Rotor 56 is supplied with a suitable source of 400-cycle alternating current from secondary 40 of transformer T3, and when it is moved from its null position, it will induce an error signal across the winding of rotor 47 which will then be imposed by means of transformer T2 upon the grids of discriminator tubes V1 and V2. The error signals are proportional in amplitude to the amount of speed error and are either in phase with the plate supply voltage to one or the other of the discriminator tubes V1 and V2. Hence, when an error signal is applied to V1 and V2, more plate current will flow through one tube and a greater voltage will be developed on that one side of the circuit than on the other. Greater current flow through one of the tubes V1 or V2 will result in unequal potentials across C1 and C2 and due to current flow through the voltage divider R3, R4, equal potentials of opposite polarity will appear at points $d$ and $f$ with respect to point $e$.

These equal voltages of opposite polarity are delivered to the multivibrator 33 as biases, which control pulse ratio in the manner described in copending application S. N. 94,984, filed May 29, 1949, in the name of Dinsmore et al. now U. S. Patent No. 2,669,312. The point $e$ of the resistor network R3, R4 is connected to the cathodes of both tube sections of vacuum tube V3 of a multivibrator circuit, the point $d$ is connected to the grid of one tube section by means of resistors R11 and R12, and the point $f$ is connected to the grid of the other tube section by means of resistors R13 and R14. Hence, the voltages appearing at points $d$ and $f$ with respect to point $e$ will appear as grid biases on the tube sections. When no error signals are supplied to the grids of the discriminator tubes, no bias voltages are developed. But when an error signal is applied to the grids of the discriminator tubes equal bias voltages of opposite polarity are developed and applied as a means of control of the multivibrator circuit.

The multivibrator circuit is of conventional design using a double tube V3, but is modified by the use of bias voltages which control the symmetry of the multivibrator output signal. When the bias voltages applied to the grids of the two tube sections are zero, the output signal of the multivibrator is of a square and symmetrical wave form. However, if the grid biases of the two tube sections are of equal but opposite polarity, the conduction times of the two tube sections are not equal and the output signal wave form is unsymmetrical. The output signal of the multivibrator 33 is directly coupled to the grids of an amplifier 32 and applied to winding 76 of a polarized relay 30. Relay 30 is provided with a movable contact 77 and stationary contacts 78 and 79. Stationary contacts 78 and 79 are electrically connected by 24 and 25 to solenoid windings 22 and 23, respectively. A pair of rectifiers 80 and 81 are connected between the stationary relay contacts 78 and 79 for arc suppression to protect the relay contacts. Movable relay contact 77 is electrically connected to a suitable source of direct current for energizing the solenoid windings.

In order to overcome the dead band range associated with the null of a selsyn signal, the grids of tubes V1 and V2 have applied thereon a small signal displaced 90 electrical degrees from each of the plate signals. This signal is only of sufficient magnitude to place the tubes V1 and V2 in condition for conduction whenever a speed error signal is applied to the grids from the selsyn system. This signal is developed by a phase shift network comprising a condenser C92 and resistors R91 and R90. This phase network is connected across the secondary winding 40 of transformer T3, which is supplied with 400-cycle A. C. current. The quadrature voltage developed at point P is applied to primary 62 of transformer T2 by means of 43, the secondary 63 of which is connected to the grids of tubes V1 and V2. The small signal, displaced in phase 90 electrical degrees from each of the plate signals of tubes V1 and V2, does not, by itself, unbalance the discriminator, and is always vectorially added to the speed error signals developed by the selsyn system. Thus, whenever speed error signals are developed by the selsyn system, the effective phase of this resultant signal causes more plate current to flow through one of the tubes V1 and V2 than the other. The magnitude of current flow through each of the tubes is determined by the amount and character of the speed error, i. e. whether an overspeed or an underspeed condition exists.

$K_1$, first order control

In Fig. 3, the on-speed condition is represented by the application of zero bias signals from the discriminator output terminals $d$ and $e$ upon the tube sections of the multivibrator, which will effect a 50:50 pulse ratio to cause a succession of alternate electrical impulses of equal time durations to be applied to the opposite windings of the electric valve. Any deviation of the prime mover speed from the selected speed setting will produce bias voltages on the tube sections of equal and opposite polarity, thus making the conduction time of one tube section longer than that of the other tube section. Hence, a corrective pulse ratio is produced which will be transmitted to the electric valve in the form of alternate electrical pulses of unequal time durations to the opposite windings thereof. If the speed deviation from the selected speed setting is of sufficient magnitude, one tube section will become continuously conductive and the pulsing action will cease. In this instance, one of the windings of the electric valve will be continuously energized, thus maintaining the valve in a fixed position where it supplies maximum corrective flow of hydraulic fluid to the motor for adjusting the load device.

The discriminator 34 is a phase and amplitude sensitive detector which responds to speed information signals supplied by the selsyn system to secondary winding 63 of transformer T2. If prime mover speed is reduced for any reason the signal appearing across secondary 63 of transformer T2 will be in phase with the plate voltage of one pair of tubes. Conduction times are now unequal, the potentials developed are unequal, and corrective biases appearing between terminals $d$ and $f$ are delivered to the multivibrator to call for an increase in speed. During an overspeed condition, the phase of the error voltage delivered to the discriminator tubes is reversed and the correction is made conversely towards a reduction in speed. If $\theta$ equals the phase angle of the grid signal with respect to one plate signal, the potential which appears across the output terminals from $d$ to $f$ is $$E_{df} = K E_p E_g \cos \theta$$

Hence, the bias signals produced by the discriminator are proportional to plate voltage $E_p$, grid voltage $E_g$ and the cosine of the angle $\theta$ between these voltages. Since $\cos \theta$ is unity in the presence of an error, these D. C. signals and the resulting blade angle correction rates are proportional to the selsyn error signals, and therefore, in normal governing, are substantially proportional to speed error at any instant. The first order control constant designated $K_1$ may be written:

$$K_1 = \frac{\frac{d\beta}{dt}}{N_p - N_g}$$

or the proportionality between rate of change of propeller blade angle and error between power plant speed and governor speed setting.

Governor speed setting is accomplished by positioning selsyn rotor 47, under control of speed control lever 42. The initial adjustment of the range of speed control is a matter of selection of the value of mass 58, the stops 60 and 61 and the value of the restraining force of spring 59 all associated with the rotor 56 of the input selsyn 54.

$K_2$, second order control

Differentiating circuits are connected between RC filters, R1, C3 and R2, C4 and the multivibrator 33 when rate sensitivity is desired. The equal potentials of opposite polarity which appear between the points $d$ and $e$, and between points $e$ and $f$ are directly proportional to speed error at any instant. The error voltage developed across C3 is differentiated by the CR network consisting of C5 and R3, and the voltage developed across C4 is differentiated by C6 and R4. Across R3 and R4, voltages appear during speed changes which are rate signals for the control of the multivibrator pulse ratio. This second order control constant, designated $K_2$, may be written $$K_2 = \frac{\frac{d\beta}{dt}}{\frac{dN}{dt}}$$

or the proportionality between the rate of change of propeller blade angle and the rate of change of prime mover speed. $K_2$ may be varied (separately) by varying the capacitance of C5 and C6.

By the inclusion of resistors R5 and R6, it may be seen that both $K_1$ and $K_2$ voltages appear across resistors R3 and R4. In this manner the governor has both $K_1$ and $K_2$ control constants.

$K_1$ and $K_2$ may be varied (simultaneously) by varying the resistors R3, R4, R5 and R6, and also by varying the 400 cycle supply voltage or the transformer turns ratio.

$K_3$, third order control

If the engine-propeller combination is to be synchronized with a reference speed source, or when greater precision is required in the control, a third order control may be employed, whereby small residual governing errors may be sensed and corrected. Blade angle corrections proportional to the time integral of these errors may be accomplished in a manner described in copending application S. N. 94,984, Dinsmore et al. This integral type control (system) comprises a 3-phase comparator 84 circuit operating a 3-phase stepping motor 85, a gear reduction 86 and stops to limit the range of control. This comparator serves as a frequency comparison means to operate the motor at a rotational speed at all times commensurate with any difference or error which may exist between the frequency of the alternator 87 and the frequency of a stable reference oscillator 83.

There are two optional methods of applying $K_3$ control to the governor. In Fig. 3, the 3-phases of the alternator 87, shown in Fig. 1, are connected by cable 52 to the comparator 84. The stepping motor 85 and its associated gear box 86 are represented with a mechanical coupling to the rotor 47 of the input selsyn 45. The resulting resetting of the selsyn unit 45 will produce an independent compensation for small errors.

This third order control, designated $K_3$ may be written $$K_3 = \frac{\frac{dN_g}{dt}}{N_{mr} - N_{pm}}$$

or the proportionality between rate of change of governor setting and error between a master reference speed index and prime mover speed.

In the modification shown in Fig. 4 the $K_3$ control is incorporated by the use of a selsyn differential unit in the circuit between the input and output selsyns. In this instance stator 55 of the input selsyn 54 is connected to rotor 89 of a selsyn differential unit 82 and the stator 88 of the selsyn differential unit 82 is electrically connected to the stator 46 of output selsyn 45. Stepping motor 85 and its associated gear-box 86 are mechanically coupled to the rotor 89 of the selsyn differential unit 82. The integral control is applied in this instance as a small phase shift inserted into the three phase selsyn circuit and produces, as a result, a small shift in the null position of selsyn rotor 56, and therefore a small change in the governed speed.

Thus, the governor circuit described has $K_1$, $K_2$ and $K_3$, and is capable of fast, accurate and stable governing.

While the embodiment of the present invention as herein disclosed constitutes a preferred form, it is to be understood that other forms might be adopted.

What is claimed is as follows:

1. Control means for a prime mover driven propeller having adjustable blades, including in combination, a fluid organization in the propeller for adjusting the blades in response to control signals, said fluid organization including an electrically operable valve for controlling the adjustment of the blades, a control organization operable to actuate the valve, said control organization including pulse producing means having an output comprising, alternate electrical impulses for operating said valve equal during on-speed conditions and unequal during off-speed conditions, a discriminator having an output connected to the input of the pulse producing means for controlling the output thereof in response to discriminator input speed information signals, a source of alternating current providing a circuit, centrifugally actuated means driven by and responsive to the speed of the prime mover for modifying the character of the signal in said circuit in proportion to the propeller speed to develop said speed information signals, and means applying said speed information signals to the input of said discriminator for controlling the output of said pulse producing means.

2. Control means for a prime mover driven propeller having adjustable blades, including in combination, a fluid organization in the propeller for adjusting the blades in response to control signals, said fluid organization including an electrically operable valve for controlling the adjustment of said blades, a control organization operable to actuate said valve, said control organization including a governor comprising pulse producing means having an output applied to said electrically operable valve, said output comprising alternate electrical impulses, equal during on-speed conditions and unequal during off-speed conditions, and a discriminator having an output connected to the input of said pulse producing means for controlling the output thereof in response to discriminator input speed information signals, a source of alternating current, means including a rotary transformer mounted on the propeller and energized from said alternating current source, speed responsive means driven by said propeller and operatively connected to one element of said rotary transformer for positioning the same to provide said speed information signals, and means applying said speed information signals to the discriminator input for controlling the output of said pulse producing means.

3. The combination set forth in claim 2 wherein the control organization includes means responsive to speed information from the rotary transformer for producing off-speed signals to the pulse producing means to obtain a rate of change of propeller blade angle in proportion to speed error.

4. The combination set forth in claim 2 wherein the discriminator is a phase-sensitive detector and includes rate circuits for producing control signals to the pulse producing means so that the rate of change of blade angle is in proportion to the rate of change of prime mover speed.

5. The combination set forth in claim 2 wherein the control organization includes means for resetting the governor at a rate proportional to error between a master reference speed index and prime mover speed.

6. Control means for a prime mover driven propeller having adjustable blades, comprising in combination, a fluid organization in the propeller for adjusting the blades in response to control signals, said fluid organization including an electrically operable valve for controlling the adjustment of the blades, a control organization operable to actuate said valve, said control organization including pulse producing means having an output comprising, alternate electrical impulses for operating said valve, equal during on-speed conditions and unequal during off-speed conditions, a discriminator having an output connected to the input of the pulse producing means for controlling the output thereof, means providing an A. C. signal, centrifugally actuated means for varying the phase of said signal to provide speed information signals proportional to propeller speed, and means applying the speed information signals to the discriminator input for controlling the discriminator output.

7. Control means for a turbine driven propeller having adjustable blades, comprising in combination, a fluid organization in the propeller for adjusting the blades in response to control signals, said fluid organization including an electrically operable valve for controlling the adjustment of the blades, a control organization operable to actuate said valve, said control organization including pulse producing means having an output comprising, alternate electrical impulses for operating said valve, equal during on-speed conditions and unequal during off-speed conditions, a discriminator having an output connected to the input of the pulse producing means for controlling the output thereof, said discriminator being a phase and amplitude sensitive detector that interprets speed information signals, the discriminator output being a function of the amount and character of speed error, means providing an A. C. signal, centrifugally actuated means for varying the phase and amplitude of said signal for providing said speed information signals proportional to propeller speed, and means applying said speed information signals to the discriminator input for controlling the discriminator output.

8. Control means for a prime mover driven propeller having adjustable blades comprising in combination, a fluid organization in the propeller for adjusting the blades in response to control signals, said fluid organization including an electrically operable valve for controlling the adjustment of the blades, a control organization operable to actuate said valve, said control organization including a source of alternating current, speed sensitive means controlling a selsyn system energized by said source of alternating current and including a first stator-rotor combination mounted for relative rotation upon propeller speed deviation from a selected speed setting and a second stator-rotor combination, said selsyn system having an output constituting speed information signals, means applying said speed information signals to the input of a discriminator, means operable to control the actuation of said valve, and means applying the output of said discriminator to said last recited means to control the operation thereof in accordance with the speed information signals from said selsyn system.

9. Control means for a prime mover driven propeller having adjustable blades including in combination, a fluid organization operatively connected with said blades for adjusting said blades in response to control signals, said fluid organization including an electrically operable valve for controlling blade adjustment, a control organization operable to actuate said valve, said control organization including pulse producing means having an output electrically connected with said valve for controlling the same, the output of said pulse producing means comprising alternate electrical impulses, equal during on-speed conditions and unequal during off-speed conditions, a source of alternating current, means energizing two circuits from said source of alternating current, centrifugally actuated means driven by said propeller and operable to modify the phase of the alternating current in one of said circuits in proportion to the speed error of said propeller, a discriminator circuit having inputs from each of said circuits and having an output that is the function of the phase difference between said two circuits, and means applying the output of said discriminator to the input of said pulse producing means for controlling the output of said pulse producing means.

10. Control means for a prime mover driven propeller having adjustable blades including in combination, a fluid organization operatively connected with said blades for adjusting said blades in response to control signals, said fluid organization including an electrically operable valve for controlling blade adjustment, a control organization operable to actuate said valve, said control organization including pulse producing means having an output electrically connected with said valve for controlling the same, the output of said pulse producing means comprising alternate electrical impulses, equal during on-speed conditions and unequal during off-speed conditions, a source of alternating current, means energizing a pair of parallel circuits from said source of alternating current, centrifugally actuated means driven by said propeller and operable to modify the phase and amplitude of the alternating current in one of said circuits in proportion to the speed error of said propeller, a discriminator circuit having inputs from each of said circuits and having an output that is the function of the phase and amplitude difference between the signals in said two circuits, and means applying the output of said discriminator to the input of said pulse producing means for controlling the output of said pulse producing means.

11. Control means for a prime mover driven propeller having adjustable blades including in combination, a fluid organization operatively connected with said blades for adjusting said blades in response to control signals, said fluid organization including an electrically operable valve for controlling blade adjustment, a control organization operable to actuate said valve, said control organization including pulse producing means having an output electrically connected with said valve for controlling the same, the output of said pulse producing means comprising alternate electrical impulses, equal during on-speed conditions and unequal during off-speed conditions, a source of alternating current, means energizing first and second circuits from said source of alternating current, centrifugally actuated means operatively connected to and driven by said propeller for modifying the alternating current in said first circuits proportional to the speed error of the propeller, said first circuit including a selsyn system comprising transmitter and receiver selsyns having stators and rotors, the transmitter rotor being operatively connected and positioned by said centrifugally actuated means, the stators of said selsyns being electrically connected, and the receiver rotor including means normally restraining it against movement such that a signal proportional to the speed error will be developed across its terminals, the construction and arrangement of said selsyn system being such that a signal null appears across the terminals of said receiver rotor when there is no speed error, a discriminator having inputs from each of said first and second circuits and having an output which is the function of the difference in signals in said two circuits, and means applying the output of said discriminator to the input of said pulse producing means for modifying the output thereof.

12. The combination set forth in claim 11 wherein means are provided for deriving a signal from said source of alternating current and applying said signal to said first circuit, said signal having a quadrature relation to the signal in said second circuit, and means applying said quadrature signal to the said first circuit input of the discriminator so that said discriminator will respond to any speed error signals developed in said selsyn system.

13. The combination set forth in claim 11 wherein the control organization includes means for adjusting the position of said receiver rotor at a rate proportional to the error between a master reference speed index and propeller speed.

14. The combination set forth in claim 11 wherein the electrical connection between the stators of said selsyn system includes a selsyn differential unit comprising a stator and a rotor.

15. The combination set forth in claim 14 wherein the control organization includes means operatively connected to the rotor of said selsyn differential for adjusting its position at a rate proportional to error between a master reference speed index and propeller speed.

16. In a speed control system, means for sensing differences between the speed of a rotating prime mover and a preselected speed, comprising, a source of alternating current, a pair of circuits energized from said source of alternating current, phase shifting means in one of said circuits, centrifugally actuated means driven by the prime mover and operatively connected with the phase shifting means for effecting actuation thereof in response to prime mover speed changes, and a phase sensitive discriminator having input signals from both of said circuits for developing an output signal in response to phase differences between the input signals from said two circuits when said prime mover is rotating at a speed different than said preselected speed.

References Cited in the file of this patent

UNITED STATES PATENTS

| | | |
|---|---|---|
| 1,988,458 | Minorsky | Jan. 22, 1935 |
| 2,306,361 | Stuart | Dec. 22, 1942 |
| 2,347,714 | Sorensen | May 2, 1944 |
| 2,382,847 | Baumann | Aug. 14, 1945 |
| 2,478,279 | Kochenburger | Aug. 9, 1949 |
| 2,510,296 | Root | June 6, 1950 |
| 2,541,666 | Quinn | Feb. 13, 1951 |